United States Patent
Berman

(10) Patent No.: US 11,207,849 B2
(45) Date of Patent: Dec. 28, 2021

(54) COMPUTER CONTROLLED SYSTEM FOR CONSTRUCTING AN ARCHITECTURAL COMPONENT FROM AN ARCHITECTURAL MATERIAL AND A METHOD FOR MANUFACTURING SUCH ARCHITECTURAL COMPONENT WITH THE COMPUTER CONTROLLED SYSTEM

(71) Applicant: BEYON 3D LTD, Tel Aviv (IL)

(72) Inventor: Ran Berman, Tel Aviv (IL)

(73) Assignee: BEYON 3D LTD, Tel Aviv (IL)

( * ) Notice: Subject to any disclaimer, the term of this patent is extended or adjusted under 35 U.S.C. 154(b) by 379 days.

(21) Appl. No.: 14/810,488

(22) Filed: Jul. 28, 2015

(65) Prior Publication Data
US 2016/0107396 A1  Apr. 21, 2016

Related U.S. Application Data

(60) Provisional application No. 62/029,612, filed on Jul. 28, 2014.

(51) Int. Cl.
*B29C 69/00* (2006.01)
*B05B 7/26* (2006.01)
(Continued)

(52) U.S. Cl.
CPC .............. *B29C 69/001* (2013.01); *B05B 7/26* (2013.01); *B05D 1/02* (2013.01); *B25J 11/00* (2013.01);
(Continued)

(58) Field of Classification Search
CPC . Y10T 29/49826; B29C 69/001; B29C 67/00; B25J 11/00; B26F 3/12;
(Continued)

(56) References Cited

U.S. PATENT DOCUMENTS

| | | | | |
|---|---|---|---|---|
| 4,686,877 A | * | 8/1987 | Jaritz | B26F 3/004 |
| | | | | 181/211 |
| 5,386,741 A | * | 2/1995 | Rennex | A61M 25/01 |
| | | | | 15/104.33 |

(Continued)

FOREIGN PATENT DOCUMENTS

WO   WO-2013064826 A1 *   5/2013   ............... B28B 3/20

OTHER PUBLICATIONS

KUKA, Expert Documentation, Configuration of Kinematic Systems (Year: 2013).*

(Continued)

*Primary Examiner* — Sarang Afzali
(74) *Attorney, Agent, or Firm* — Cantor Colburn LLP

(57) ABSTRACT

A method and system for constructing an architectural component from a three-dimensional form, the system including a movable support table for supporting and moving a three-dimensional form, a multi-task robotic arm having a base end configured for controlled movement along a path proximate the support table and a distal end configured to extend, translate, and/or rotate relative to the base and to include an end effector for applying successive layers of material onto a form on the support table, optionally, a linear rail to which said base is attached, and a computer processor for controlling a sequence of movements of the support table, the base, and the distal end of said multi-task robotic arm, and for controlling application of material to the three-diniensional form to form an architectural component of a predetermined shape and dimension.

19 Claims, 10 Drawing Sheets

(51) Int. Cl.
*B33Y 30/00* (2015.01)
*B33Y 10/00* (2015.01)
*B29C 67/00* (2017.01)
*B28B 1/00* (2006.01)
*B25J 11/00* (2006.01)
*B05D 1/02* (2006.01)
*B26F 3/12* (2006.01)
*B33Y 50/00* (2015.01)
*B29L 31/00* (2006.01)

(52) U.S. Cl.
CPC .................. *B26F 3/12* (2013.01); *B28B 1/00* (2013.01); *B29C 67/00* (2013.01); *B29L 2031/772* (2013.01); *B33Y 10/00* (2014.12); *B33Y 30/00* (2014.12); *B33Y 50/00* (2014.12)

(58) Field of Classification Search
CPC ....... B05B 7/26; B05D 1/02; B29L 2031/772; B33Y 50/00; B33Y 30/00; B28B 1/00
See application file for complete search history.

(56) References Cited

U.S. PATENT DOCUMENTS

2007/0020459 A1\* 1/2007 Roberts ............... B29C 37/0032
  428/411.1
2011/0259460 A1\* 10/2011 Bauer .................... F16L 55/28
  138/97
2016/0001461 A1\* 1/2016 Gardiner ................. B25J 11/00
  264/219

OTHER PUBLICATIONS

Video disclosed at URL https://vimeo.com/48374170, uploaded on Tuesday, Aug. 28, 2012 at 11:13 AM EST.
https://archinect.com/benbusch/project/icd-itke-research-pavilion-2011, Summer 2011.

\* cited by examiner

COMPUTER CONTROLLED SYSTEM FOR CONSTRUCTING AN ARCHITECTURAL COMPONENT FROM AN ARCHITECTURAL MATERIAL AND A METHOD FOR MANUFACTURING SUCH ARCHITECTURAL COMPONENT WITH THE COMPUTER CONTROLLED SYSTEM

REFERENCE TO RELATED APPLICATIONS

This application claims priority from U.S. Provisional Patent Application No. 62/029,612, filed 28 Jul. 2014, which is hereby incorporated by reference in its entirety.

FIELD OF THE INVENTION

The present invention relates in general to construction of architectural components, and particularly to the use of computer controlled robotic arms for fabricating large-scale architectural concrete layered panels over polymeric forms.

BACKGROUND OF THE INVENTION

At present, the construction industry relies heavily on the use of on-site manual labor. This process is highly inefficient, as it wastes human resources and materials, frequently resulting in cost overruns, late delivery, and construction reworking. The advent of 3D printing technology may seem promising, but current 3D technology suffers from problems of scale and quality of fabrication, as it employs additive printing processes through sequential layering of polymeric or thermoplastic materials. Furthermore, 3D printing processes are generally not suitable for manufacturing large architectural structures or for creating cladding components on any architectural scale. Computer Numerical Control (CNC) machines can operate on large objects. CNC machines impose severe restrictions on the geometry and material of the work pieces, however. Increasingly, customers are demanding more complex and difficult to fabricate architectural structures, for example, structures with curvilinear shapes or are made of composite materials. Thus, the fundamental limitations of digital fabrication technologies and mass production techniques currently known in the art limit the extent to which these methods can provide a solution to the problems outlined above.

There is thus a need for automated construction technology that is cost-effective and deployable in factories or at construction sites and that is not limited by an architect's choice of design, geometry, or material, and that allows for easy and rapid implementation from initial design to final manufacture (on-site or off-site).

SUMMARY OF THE INVENTION

It is an object of the invention to provide a computer implemented method and system for fabricating architectural components of desired shapes and configurations using a robotic arm and end effectors. A method and system for preparing architectural components from custom-made molds are disclosed in which an architectural material (non-limiting examples of suitable architectural materials include gypsum, concrete, synthetic marble, and clay) is layered onto a surface of a custom-made three-dimensional form is disclosed.

It is thus an object of the present invention to disclose a method for manufacturing an architectural component, wherein said method comprises sequentially layering an architectural material on at least one surface of a three-dimensional form made of a polymeric material, thereby producing said architectural component; and removing said architectural component from said three-dimensional form.

It is a further object of the present invention to disclose such a method, wherein said step of preparing a three-dimensional form from a work piece made of a polymeric material comprises at least one step selected from the group consisting of: (a) using a hot-wire foam cutter to sequentially remove material from said work piece; (b) preparing a three-dimensional form by use of a computer-controlled multi-task robotic arm; (c) machining said architectural component; (d) milling said architectural component; (e) drilling through said architectural component; and, (f) supporting a work piece made of a polymeric material on a movable support table in communication with a computer processor, said support table capable of movement in response to commands from said computer processor followed by sequentially removing material from said work piece by use of an end effector positioned at a distal end of a multi-task robotic arm in communication with said computer processor and moving in cooperation with said support table in response to commands from said computer processor, thereby forming a three-dimensional form having a desired shape.

It is a further object of this invention to disclose a method as defined in any of the above, wherein said step of preparing a three-dimensional form from a work piece made of a polymeric material comprises using a hot-wire foam cutter to sequentially remove material from said work piece; and milling said work piece.

It is a further object of this invention to disclose the method as defined in any of the above, wherein said step of sequentially layering an architectural material comprises: introducing a cement mix, aggregate, water, optionally at least one of cellulose and superplasticizer into a mixing chamber in fluid communication with a first inlet into a nozzle; mixing said cement mix, aggregate, water, and, if present, cellulose and superplasticizer in said mixing chamber, thereby producing a mixture; introducing a solution or dispersion comprising a setting time accelerant into a second inlet into said nozzle such that said solution is at least partially nebulized within said nozzle mixing chamber; introducing a thickening agent into a third inlet into said nozzle such that said thickening agent is at least partially nebulized within said nozzle; introducing said mixture into said nozzle via said first inlet such that said mixture passes through said solution or dispersion and said thickening agent within said nozzle, thereby creating a wet architectural material; and, spraying said wet architectural material from said spray nozzle onto at least one surface of said three-dimensional form before said initial setting time of said wet architectural material.

It is a further object of this invention to disclose a method for preparing a three-dimensional form, from a work piece made of a polymeric material, comprising: supporting a work piece made of a polymeric material on a movable support table in communication with a computer processor, said support table capable of movement in response to commands from said computer processor; sequentially removing material from said work piece by use of an end effector comprising a hot-wire foam cutter, said end effector positioned at a distal end of a multi-task robotic arm in communication with said computer processor and moving in cooperation with said support table in response to commands from said computer processor, thereby forming a three-dimensional form having a desired shape; and, optionally milling said three-dimensional form subsequent to said step of sequentially removing material from said work piece. In preferred embodiments of the method, it further comprises applying a layer of a coating material to at least one surface of said three-dimensional form.

It is a further object of the present invention to disclose such a method, comprising a step of preparing a three-dimensional form from a work piece made of a polymeric material, said three-dimensional form having at least one surface, prior to said step of sequentially layering an architectural material on said at least one surface. In preferred embodiments of the invention, said step of preparing a three-dimensional form from a work piece made of a polymeric material comprises using a hot-wire foam cutter to sequentially remove material from said work piece. In more preferred embodiments of the invention, said step of using a hot-wire foam cutter to sequentially remove material from said work piece is followed by a step of milling said work piece. In other preferred embodiments of the invention, said step of preparing a three-dimensional form from a work piece made of a polymeric material comprises preparing a three-dimensional form by use of a computer-controlled multi-task robotic arm.

It is a further object of this invention to disclose the method as defined in any of the above, further comprising attaching fasteners to said architectural component.

It is a further object of this invention to disclose the method as defined in any of the above, comprising preparing said at least one surface of said three-dimensional form prior to said step of sequentially applying layers of architectural material.

In some preferred embodiments of the invention, said step of preparing said at least one surface of said three-dimensional form comprises applying a layer of a coating material. In some preferred embodiments of the invention, said coating material comprises at least one component selected from the group consisting of waxes and oils. In some preferred embodiments of the invention, said coating material comprises at least two components, and said step of applying a layer of a coating material is preceded by a step of combining said at least two components. In some particularly preferred embodiments of the invention, wherein said two components are paraffin wax and canola oil. In some yet more preferred embodiments of the invention, wherein said coating material comprises a 90:10 (w/w) mixture of paraffin wax and canola oil. In some preferred embodiments of the invention, said step of preparing said at least one surface of said three-dimensional form comprises smoothing and/or polishing said at least one surface to a mirror finish.

In some preferred embodiments of the invention, said step of applying a layer of coating material comprises: heating said coating material in a storage vessel until said coating material liquefies; passing said liquefied coating material to a spray head oriented toward said three-dimensional form; and, spraying said coating material on said at least one surface of said three-dimensional form. In some particularly preferred embodiments of the invention, said storage vessel comprises a gas inlet and an outlet for said coating material, and said step of passing said liquefied coating material comprises (a) feeding pressurized gas into said storage vessel after said coating material has at least partially liquefied, thereby forcing said liquefied coating material through said outlet, and (b) passing said liquefied coating material through a heated line to a spray head oriented toward said three-dimensional form. In some preferred embodiments of the invention, said coating material comprises at least two components, and further comprising combining said at least two components in said storage vessel. In some preferred embodiments of the invention, said two components are paraffin wax and canola oil. In some more preferred embodiments of the invention, said coating material comprises a 90:10 (w/w) mixture of paraffin wax and canola oil. In some yet more preferred embodiments of the invention, the method additionally comprises stirring said coating material in said storage vessel after said coating material has at least partially liquefied. In some preferred embodiments of the invention, said spray head is positioned at a distal end of a multi-task robotic arm. In some preferred embodiments of the invention, said step of applying coating material comprises applying a layer of 2-3 mm thickness of applying coating material.

It is a further object of this invention to disclose the method as defined in any of the above, additionally comprising heating said coating material deposited on said three-dimensional form until said coating material at least partially liquefies, thereby producing a smooth layer of coating material.

It is a further object of this invention to disclose the method as defined in any of the above, wherein said step of preparing a three-dimensional form from a work piece made of a polymeric material comprises: supporting a work piece made of a polymeric material on a movable support table in communication with a computer processor, said support table capable of movement in response to commands from said computer processor; and, sequentially removing material from said work piece by use of an end effector positioned at a distal end of a multi-task robotic arm in communication with said computer processor and moving in cooperation with said support table in response to commands from said computer processor, thereby forming a three-dimensional form having a desired shape.

It is a further object of this invention to disclose the method as defined in any of the above, wherein said step of applying a layer of coating material comprises applying said coating material from a second effector at said distal end of said multi-task robotic arm and in cooperation with said support table, said second effector in fluid communication with said storage vessel.

It is a further object of this invention to disclose the method as defined in any of the above, wherein said step of sequentially applying layers of architectural material comprises sequentially applying layers of architectural material onto said three-dimensional form by using said second effector.

It is a further object of this invention to disclose the method as defined in any of the above, additionally comprising at least one step selected from the group consisting of machining said architectural component, milling said architectural component, and drilling through said architectural component, said step effected by a third end effector at said distal end of said multi-task robotic arm in cooperation with said support table.

It is a further object of this invention to disclose the method as defined in any of the above, wherein said step of sequentially layering an architectural material on at least one surface of a three-dimensional form made of a polymeric material comprises layering said architectural material in layers each of which has a thickness of less than 1 mm.

It is a further object of this invention to disclose the method as defined in any of the above, wherein said step of sequentially layering an architectural material on at least one surface of a three-dimensional form comprises sequentially layering an architectural material on at least one surface of a three-dimensional form until a thickness of between 8 and 20 mm is obtained.

It is a further object of this invention to disclose the method as defined in any of the above, wherein said architectural material is selected from the group consisting of concrete, gypsum, clay, and synthetic marble.

It is a further object of this invention to disclose the method as defined in any of the above, wherein said architectural material has an initial setting time of no more than between 10 seconds and 5 minutes. In some preferred embodiments of the invention, said architectural material has an initial setting time of no more than 3 minutes. In some preferred embodiments of the invention, said architectural material has an initial setting time of no more than 1 minute. In some preferred embodiments of the invention, said architectural material is characterized by a viscosity that increases by at least 50% $min^{-1}$ for the first 3 minutes after its casting.

It is a further object of this invention to disclose the method as defined in any of the above, wherein said architectural material comprises Portland cement powder, aggregate, cellulose, a superplasticizer, water, a setting time accelerant, and a thickening agent.

It is a further object of this invention to disclose the method as defined in any of the above, wherein said step of sequentially layering an architectural material on at least one surface of a three-dimensional form comprises: preparing a wet architectural material characterized by an initial setting time; applying a layer of said wet architectural material to said three-dimensional form prior to said initial setting time; and, repeating at least one of said steps of preparing a wet architectural material and applying a layer of said wet architectural material to said three-dimensional form as necessary. In some preferred embodiments of the invention, said step of preparing a wet architectural material comprises: preparing a mixture of cement mix, aggregate, and optionally cellulose; adding a solution of superplasticizer to said mixture; mixing until a homogeneous slurry is obtained; and, dispersing a setting time accelerant and a thickening agent into said slurry.

In some preferred embodiments of the invention, said step of preparing a wet architectural material comprises: introducing a first solution or dispersion comprising superplasticizer into a first mixing chamber in fluid connection with a first inlet into a nozzle mixing chamber, said nozzle mixing chamber in fluid communication with a spray nozzle; introducing a second solution or dispersion comprising a setting time accelerant and a thickening agent into a second mixing chamber in fluid connection with a second inlet into said nozzle mixing chamber; introducing cement mix, aggregate, water, and optionally cellulose into a third mixing chamber in fluid communication with a third inlet into said nozzle mixing chamber; mixing said cement mix, aggregate, water, and optionally cellulose, thereby producing a mixture; introducing said first solution or dispersion into said nozzle mixing chamber via said first inlet such that said first solution or dispersion is at least partially nebulized within said nozzle mixing chamber; introducing said second solution or dispersion into said nozzle mixing chamber via said second inlet such that said second solution or dispersion is at least partially nebulized within said nozzle mixing chamber; introducing said mixture into said nozzle mixing chamber via said third inlet such that said mixture passes through said first solution and said second solution within said nozzle mixing chamber, thereby creating a wet architectural material; and, passing said wet architectural material into said spray nozzle before said initial setting time of said wet architectural material.

It is a further object of this invention to disclose the method as defined in any of the above, wherein said polymeric material comprises polystyrene. In some preferred embodiments of the invention, said polymeric material comprises expanded polystyrene foam.

It is a further object of this invention to disclose a method for preparing a three-dimensional form from a work piece made of a polymeric material, comprising: supporting a work piece made of a polymeric material on a movable support table in communication with a computer processor, said support table capable of movement in response to commands from said computer processor; and sequentially removing material from said work piece by use of an end effector positioned at a distal end of a multi-task robotic arm in communication with said computer processor and moving in cooperation with said support table in response to commands from said computer processor, thereby forming a three-dimensional form having a desired shape.

It is a further object of this invention to disclose such a method for preparing a three-dimensional form from a work piece made of a polymeric material, wherein said step of sequentially removing material from said work piece comprises sequentially removing material from said work piece by use of a hot-wire foam cutter. In some preferred embodiments of the invention, said step of sequentially removing material from said work piece by use of a hot-wire foam cutter is followed by a step of milling said work piece.

It is a further object of this invention to disclose such a method for preparing a three-dimensional form from a work piece made of a polymeric material as defined in any of the above, wherein said three-dimensional form comprises at least one surface and comprising an additional step of preparing said at least one surface of said three-dimensional form subsequent to said step of sequentially removing material. In some preferred embodiments of the invention, said step of preparing said at least one surface of said three-dimensional form comprises applying a layer of a coating material. In some preferred embodiments of the invention, said coating material comprises at least one component selected from the group consisting of waxes and oils. In some preferred embodiments of the invention, said coating material comprises at least two components, and said step of applying a layer of a coating material is preceded by a step of combining said at least two components. In some particularly preferred embodiments of the invention, said two components are paraffin wax and canola oil. In some particularly preferred embodiments of the invention, said coating material comprises a 90:10 (w/w) mixture of paraffin wax and canola oil. In some particularly preferred embodiments of the invention, said step of preparing said at least one surface of said three-dimensional form comprises smoothing and/or polishing said at least one surface to a mirror finish. In some embodiments of the invention, said step of applying a layer of coating material comprises: heating said coating material in a storage vessel until said coating material liquefies; passing said liquefied coating material to a spray head oriented toward said three-dimensional form; and, spraying said coating material on said at least one surface of said three-dimensional form. In some embodiments of the invention, said storage vessel comprises a gas inlet and an outlet for said coating material, and said step of passing said liquefied coating material comprises: feeding pressurized gas into said storage vessel after said coating material has at least partially liquefied, thereby forcing said liquefied coating material through said outlet; and, passing said liquefied coating material through a heated line to a spray head oriented toward said three-dimensional form.

It is a further object of this invention to disclose a method for preparing a three-dimensional form from a work piece made of a polymeric material as defined in any of the above, wherein said polymeric material comprises polystyrene. In some preferred embodiments of the invention, said polymeric material comprises expanded polystyrene foam.

It is a further object of this invention to disclose a method of sequentially layering an architectural material on at least one surface of a three-dimensional form, comprising: preparing a wet architectural material characterized by an initial setting time; applying a layer of said wet architectural material to at least one surface of a three-dimensional form prior to said initial setting time; and, repeating at least one of said steps of preparing a wet architectural material and applying a layer of said wet architectural material to said at least one surface of said three-dimensional form as necessary.

It is a further object of this invention to disclose such a method of sequentially layering an architectural material on at least one surface of a three-dimensional form, wherein said step of preparing a wet architectural material comprises: preparing a mixture of cement mix, aggregate, and optionally cellulose; adding a solution of superplasticizer to said mixture; mixing until a homogeneous slurry is obtained; and, dispersing a setting time accelerant and a thickening agent into said slurry.

It is a further object of this invention to disclose such a method of sequentially layering an architectural material on at least one surface of a three-dimensional form, wherein said step of preparing a wet architectural material comprises: introducing a first solution comprising superplasticizer into a first mixing chamber in fluid connection with a first inlet into a nozzle mixing chamber, said nozzle mixing chamber in fluid communication with a spray nozzle; introducing second solution comprising a setting time accelerant and a thickening agent into a second mixing chamber in fluid connection with a second inlet into said nozzle mixing chamber; introducing cement mix, aggregate, water, and optionally cellulose into a third mixing chamber in fluid communication with a third inlet into said nozzle mixing chamber; mixing said cement mix, aggregate, water, and optionally cellulose, thereby producing a mixture; introducing said first solution into said nozzle mixing chamber via said first inlet such that said first solution is at least partially nebulized within said nozzle mixing chamber; introducing said second solution into said nozzle mixing chamber via said second inlet such that said second solution is at least partially nebulized within said nozzle mixing chamber; introducing said mixture into said nozzle mixing chamber via said third inlet such that said mixture passes through said first solution and said second solution within said nozzle mixing chamber, thereby creating a wet architectural material; and, passing said wet architectural material into said spray nozzle before said initial setting time of said wet architectural material.

It is a further object of this invention to disclose such a method of sequentially layering an architectural material on at least one surface of a three-dimensional form as defined in any of the above, wherein said three-dimensional form comprises a polymeric material. In some preferred embodiments of the invention, said polymeric material comprises polystyrene. In some particularly preferred embodiments of the invention, said polymeric material comprises expanded polystyrene foam.

It is a further object of this invention to disclose a computer controlled system for constructing an architectural component from a three-dimensional form, comprising: a support table for supporting and moving a three-dimensional form, said support table being configured for translational and/or rotational movement; a multi-task robotic arm having a base and a distal end, said base being configured for controlled movement along a path proximate the support table, said distal end of said multi-task robotic arm being configured to extend, translate, and/or rotate relative to said base and further configured to include an end effector for applying successive layers of material onto and/or removing material from said form at said support table; optionally, a linear rail to which said base is attached; and, a computer processor containing instructions for controlling a sequence of movements of said support table and each of said base and said distal end of said multi-task robotic arm and for determining and sequentially applying layers of material onto and/or sequentially removing material from said three-dimensional form to form an architectural component of a predetermined shape and dimension. In some preferred embodiments of the system, said end effector comprises at least one effector selected from the group consisting of (a) a hot-wire foam cutter for removing material from said three-dimensional form; (b) a machining end effector for at performing least one action selected from the group consisting of drilling, reaming, countersinking, milling, routing, net trimming, impacting, and fastener attaching; (c) an effector configured for spraying a substance onto a surface of said three-dimensional form, (d) an effector configured for combining and/or mixing one or more polymer components into a unitary polymer and for spraying said unitary polymer onto a surface of said three-dimensional form; and, (e) a cement spray rig, said cement spray rig comprising a spray head.

In some embodiments of the system, said end effector comprises a concrete spray rig, and spray head comprises at least three spray head inlets, and said concrete spray rig comprises: a first mixing chamber comprising an outlet in fluid connection with a first spray head inlet; a second mixing chamber comprising at least one inlet and an outlet in fluid connection with a second spray head inlet; and, a third mixing chamber comprising at least one inlet and an outlet in fluid connection with a third spray head inlet. It is within the essence of the invention wherein said spray head is configured such that when material enters said spray head simultaneously through said first spray head inlet and at least one of said second spray head inlet and said third spray head inlet, at least part of material entering said spray head from said first spray head inlet encounters material entering from any other spray head inlet through which material is entering said spray head. In some embodiments, the system additionally comprises vibrating means mechanically connected to said first mixing tank for vibrating at least a portion of said first mixing chamber.

It is a further object of the invention to disclose the system as defined in any of the above, wherein said instructions comprise at least one software package selected from the group consisting of: (a) real-time collision detection software that is configured to enable the system to detect automatically at least one status selected from the group consisting of (i) two components moving on a course that will cause them to collide; (ii) two components are within a predetermined distance of one another; and (iii) one component is on a course to self-collision; (b) real-time simulation software configured to enable an operator to view a simulation of movement of at least one component of said system; (c) an interface that is configured to allow transfer of an unlimited number of points from said computer processor to any other component of the system; and, (d) software configured to accept as input a desired geometry of said three-dimensional form and to control said system from said input to a final construction of an architectural component without any intervention by an operator of the system.

It is a further object of this invention to disclose a computer controlled system for constructing an architectural component from a three-dimensional form, comprising: a support table for supporting and moving a three-dimensional form, said support table being configured for translational and/or rotational movement; a multi-task robotic arm having a base and a distal end, said base being configured for controlled movement along a path proximate the support table, said distal end of said multi-task robotic arm being configured to extend, translate, and/or rotate relative to said base and further configured to include an end effector for applying successive layers of material onto and/or removing material from said form at said support table; and a computer processor containing instructions for controlling a sequence of movements of said support table and each of said base and said distal end of said multi-task robotic arm and for determining and sequentially applying layers of material onto and/or sequentially removing material from said three-dimensional form to form an architectural component of a predetermined shape and dimension. In some embodiments of the system, it further comprises a linear rail to which said base is attached.

It is a further object of this invention to disclose such a system as defined in any of the above, wherein said end effector includes a hot-wire foam cutter for removing material from said three-dimensional form. In some preferred embodiments of the invention, the system comprises a milling end effector for milling the three-dimensional form after material has been removed by the hot-wire foam cutter.

It is a further object of this invention to disclose such a system as defined in any of the above, wherein said end effector includes a machining end effector for at performing least one action selected from the group consisting of drilling, reaming, countersinking, milling, routing, net trimming, impacting, and fastener attaching.

It is a further object of this invention to disclose such a system as defined in any of the above, wherein said end effector is configured for spraying a substance onto a surface of said three-dimensional form. In some preferred embodiments of the invention, said end effector is configured for spraying a substance material onto a surface of said three-dimensional form in layers having a thickness of between 2 and 3 mm. In some preferred embodiments of the invention, said end effector is configured for combining and/or mixing one or more polymer components into a unitary polymer and for spraying said unitary polymer onto a surface of said three-dimensional form. In some preferred embodiments of the invention, said substance is selected from the group consisting of oil, wax, polymers, gypsum, and concrete. In some preferred embodiments of the invention, said substance is selected from the group consisting of oil, wax, combinations thereof, and mixtures thereof.

In some preferred embodiments of the system in which said end effector is configured for spraying a substance onto a surface of said three-dimensional form, said end effector comprises: a spray head; and, a storage vessel configured to heat substances contained within, said storage vessel comprising an outlet in fluid communication with said spray head. In some preferred embodiments of the system, it comprises a heated wax transfer line connecting said spray head and said outlet of said storage vessel. In some preferred embodiments of the invention, said storage vessel comprises an internal mixer. In some preferred embodiments of the invention, it comprises a pressurized gas system closably connected to at least one of said storage vessel and said spray head.

It is a further object of this invention to disclose such a system as defined in any of the above, wherein said end effector comprises a cement spray rig, said cement spray rig comprising a spray head. In some preferred embodiments of the invention, said spray head comprises at least three spray head inlets, and said cement spray rig comprises: a first mixing chamber comprising an outlet in fluid connection with a first spray head inlet; a second mixing chamber comprising at least one inlet and an outlet in fluid connection with a second spray head inlet; and a third mixing chamber comprising at least one inlet and an outlet in fluid connection with a third spray head inlet; and further wherein said spray head is configured such that when material enters said spray head simultaneously through said first spray head inlet and at least one of said second spray head inlet and said third spray head inlet, at least part of material entering said spray head from said first spray head inlet encounters material entering from any other spray head inlet through which material is entering said spray head. In some embodiments of the system, it additionally comprises vibrating means mechanically connected to said first mixing chamber for vibrating at least a portion of said first mixing chamber. In some embodiments of the system, at least one of said mixing chambers comprises mixing means for mixing contents of said mixing chamber. In some embodiments of the system, said fluid connection between said third mixing chamber and said third spray head inlet comprises a flexible hose; in some preferred embodiments of the invention, said flexible hose is mechanically connected to said vibrating means.

It is a further object of this invention to disclose a system as defined in any of the above, wherein said instructions comprise real-time collision detection software that is configured to enable the system to detect automatically at least one status selected from the group consisting of (a) two components moving on a course that will cause them to collide; and, (b) two components are within a predetermined distance of one another.

It is a further object of this invention to disclose a system as defined in any of the above, wherein said instructions comprises real-time simulation software configured to enable an operator to view a simulation of movement of at least one component of said system.

It is a further object of this invention to disclose a system as defined in any of the above, wherein said instructions comprise an interface that is configured to allow transfer of an unlimited number of points from said computer processor to any other component of the system.

It is a further object of this invention to disclose a system as defined in any of the above, wherein said instructions comprise software configured to accept as input a desired geometry of said three-dimensional form and to control said system from said input to a final construction of an architectural component without any intervention by an operator of the system.

It is a further object of this invention to disclose a concrete spray rig for preparing and spraying concrete, wherein said concrete spray rig comprises: a spray head; a first mixing chamber comprising an outlet in fluid connection with a first spray head inlet; a second mixing chamber comprising at least one inlet and an outlet in fluid connection with a second spray head inlet; and, a third mixing chamber comprising at least one inlet and an outlet in fluid connection with a third spray head inlet; and further wherein said spray head is configured such that when material enters said spray head simultaneously through said first spray head inlet and at least one of said second spray head inlet and said third spray head inlet, at least part of material entering said spray head from said first spray head inlet encounters material entering from any other spray head inlet through which material is entering said spray head.

In some embodiments of the concrete spray rig, it additionally comprises vibrating means mechanically connected to said first mixing chamber for vibrating at least a portion of said first mixing chamber. In some embodiments of the concrete spray rig, at least one of said mixing chambers comprises mixing means for mixing contents of said mixing chamber. In some embodiments of the concrete spray rig, said fluid connection between said third mixing chamber and said third spray head inlet comprises a flexible hose; in some preferred embodiments, said fluid connection between said third mixing chamber and said third spray head inlet comprises a flexible hose mechanically connected to said vibrating means.

Another object of the invention is to provide a system that employs additive and subtractive means to create a mold from a work piece preferably made of polystyrene for fabricating concrete based architectural components.

Another object is to provide a robotic arm and a support table that are responsive to commands from a computer processor and associated software to move along a path and to engage in motions including rotation, extension, and translation. The support table is configured to support an architectural mold or work piece upon which the robotic arm employs additive and/or subtractive processes to construct an architectural component. The support table is preferably configured as a rotary table for rotational movement.

Another object of the invention it to provide a method of constructing an architectural component from a three-dimensional mold, preferably made of expanded polystyrene (EPS) and created by additive and subtractive processes using end effectors connected to a robotic arm.

Still another object of the invention is to provide a lightweight and strong layered concrete panel consisting of thin layers of concrete sprayed on a polystyrene mold and which is capable of forming complex, non-conventional shells.

According to one aspect of the invention, a base of the robotic arm is movably mounted on guide rails and a distal end of the robotic arm is configured to extend, translate, and/or rotate and is further configured to accept an end effector for spraying material (e.g., concrete or polymer) or for machining operations (e.g. milling, drilling, countersinking, hot-wire operations) or for attaching fasteners. Selective movement of the robotic arm and the support table may be achieved using stepper motors and/or pneumatic/hydraulic actuators that are operatively connected to a computer processor.

According to another aspect of the invention, the system utilizes one or more robotic arms arranged in successive positions for sequential layering of materials (e.g. spraying layers of concrete) onto one or more sides of an architectural mold on the movable support table and for sequential machining operations (e.g., computer numerical controlled (CNC) machining processes) between sprayed-on layers to form complex, unconventional shaped architectural components.

According to one embodiment, a computer controlled system for constructing an architectural component from a three-dimensional architectural mold, comprising: (a) a rotary table for rotatably supporting and moving a three-dimensional architectural mold, the support table being configured for translational and/or rotational movements; (b) a multi-task robotic arm having a base and a distal end, the base being configured for controlled movement along a path proximate the support table, the distal end of the multi-task robotic arm being configured to extend, translate and/or rotate relative to the base and further configured to include an end effector for applying successive layers of material onto and/or removing materials from the architectural mold at the support table; and (c) a computer processor containing instructions for controlling a sequence of movements of the support table and each of the base and the distal end of the multi-task robotic arm and for determining and sequentially applying layers of material onto and/or sequentially removing materials from the architectural mold to form an architectural component of a predetermined shape and dimension from the architectural mold.

In another embodiment, a computer implemented process for creating an architectural component, comprising the steps of: (a) providing a three-dimensional work piece; (b) supporting on a movable support table the three-dimensional work piece comprising an expanded polystyrene foam, movement of the movable support table being responsive to commands from a computer processor; (c) using a first end effector at a distal end of a multi-task robotic arm and in cooperation with the support table, sequentially removing material from the work piece to form a three-dimensional architectural mold, the end effector being responsive to commands of the computer processor; (d) using a second end effector at the distal end of the multi-task robotic arm and in cooperation with the support table, sequentially applying layers of concrete onto the three-dimensional architectural mold; and (e) using a third end effector at the distal end of the multi-task robotic arm and in cooperation with the support table, machining, milling, and/or drilling through a surface of the three-dimensional architectural mold to form an architectural component.

Other objects and features of the present invention will become apparent from the following detailed description in conjunction with the accompanying drawings. It is to be understood, however, that the drawings are presented solely for illustration and not as a definition of the limits of the invention, for which reference should be made to the appended claims. It should further understood that the drawings are not necessarily drawn to scale and that unless otherwise indicated they are merely intended to illustrate conceptually the structures and procedures described herein.

BRIEF DESCRIPTION OF THE DRAWINGS

The invention will now be described with reference to the drawings, wherein.

DETAILED DESCRIPTION OF THE PREFERRED EMBODIMENTS

Figure 1B:
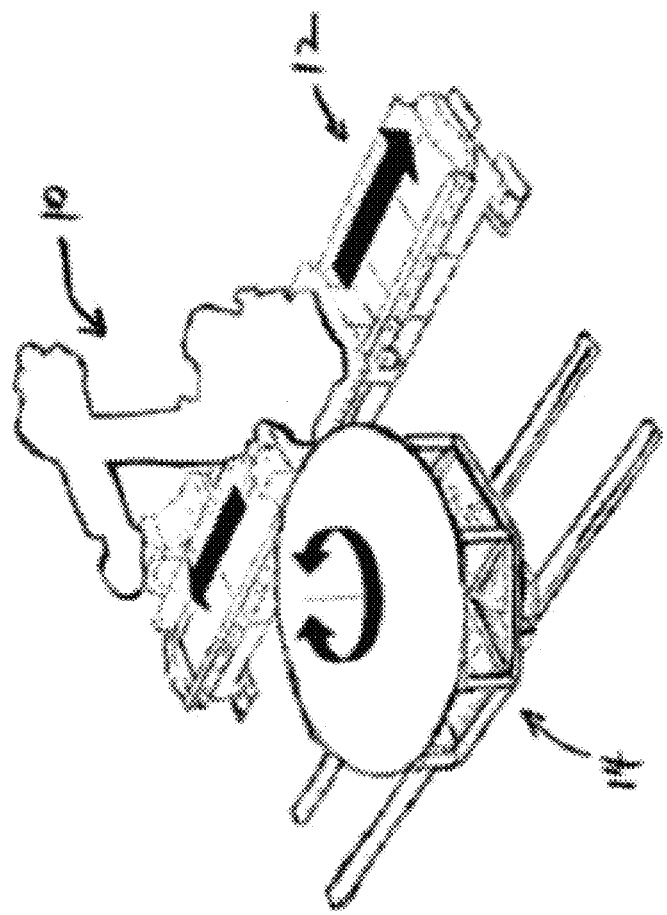
FIGS. 1A and 1B depict views of a robotic arm and the robotic arm mounted on a support table, respectively.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims.

As used herein, the term "architectural component" refers to any component that can be used in the construction of, or can be attached to, a building or structure. The term can be used to refer components that are functional as well as those that are purely decorative, as well as to panels of architectural material.

As used herein, the term "architectural material" refers to any material that can be used in the construction of, or can be attached to, a building or structure, particularly materials that comprise a plurality of components that must be mixed prior to use. Non-limiting examples of architectural materials as the term is used herein include cement and concrete.

As used herein, the term "three-dimensional form" refers to an object that has at least one surface onto which architectural material is to be layered in order to form an architectural component. The three-dimensional form may be a mold or any shaped object which, when removed from the layered material, will yield an architectural component of the desired shape and size. Note that cases in which the surface of interest of the form is partially or entirely flat are contemplated by the inventors as being within the scope of the term as used herein.

As used herein, the term "Beyon3D" refers to the system or method disclosed herein for fabricating architectural components.

The invention is directed to a method for fabricating architectural components (in preferred embodiments, custom-designed and made components) and to a computer controlled robotic arm system for fabricating them. The system and method employ additive and subtractive manufacturing processes through the use of end effectors selectively attached to one or more mobile and articulate robotic arms. The end effectors controllably and selectively shape a surface of a work piece into a three-dimensional form (e.g. a mold), prepare the surface of the mold (in preferred embodiments, by spraying a layer of polymeric material such as a wax-oil blend onto the surface of the mold, thereby sealing it), and then apply thin layers of an architectural material such as concrete (e.g. self-consolidating concrete), gypsum, clay, synthetic marble, etc. onto the surface of the prepared form, thereby forming an architectural component comprising layers of the architectural material. After the architectural material is cured, a substructure can be attached to the component using, for example, fastening bolts and nuts embedded in the panel by the robotic arm(s). The component is extracted from the form by pulling the substructure and the attached component from the form. The substructure can also be used to provide an interface between the component and an existing building structure or to provide additional strength or rigidity to the architectural component. Advantageously, the inventive process provides civil engineers and architects a cost-effective solution for producing strong, lightweight concrete or cement architectural components having any desired shape, whether it be a simple flat panel or a complex curvilinear shape.

Figure 1A:
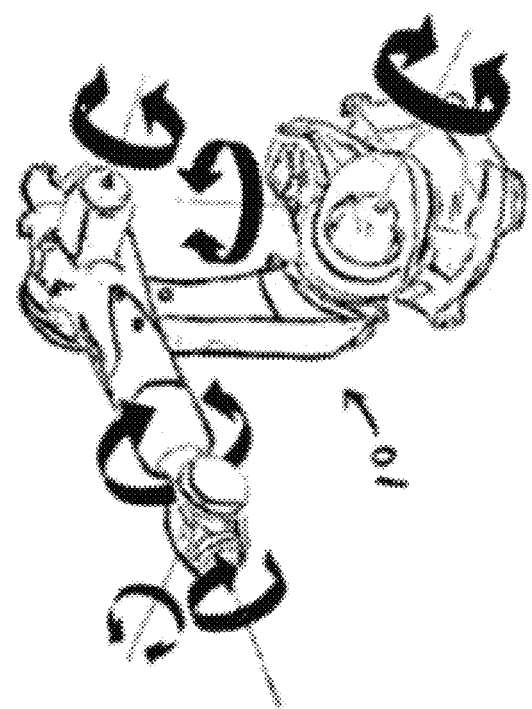

Reference is now made to FIG. 1, which provides a schematic illustration of one embodiment of the system disclosed herein. FIG. 1A illustrates a computer controlled robotic arm 10 that is capable of 6-axis movement (indicated by the double-headed arrows in the figure). As shown in FIG. 1B, robotic arm 10 is mounted on a controllably moveable carriage coupled to a guide 12. In preferred embodiments, the robotic arm works in conjunction with a computer controlled positioner for position a work piece for the robotic arm. The positioner provides a rotary table 14 for mounting the work piece and to add a rotational axis of movement to the inventive system. According to one aspect of the inventive process herein disclosed, the work piece is shaped into a mold by subtractive processes from which an architectural component can be fabricated through additive and subtractive processes according to the method described below. The system disclosed herein is a universal system operable with any commercially available computer-controlled robotic construction system. A non-limiting example of commercially available components that are compatible with the system herein disclosed comprises a Kuka™ KR Quantec Extra HA robotic arm; a Kuka™ KL 1500-3 linear guide rail; and a Kuka™ KP1-MB computer-controlled positioner.

Figure 2:
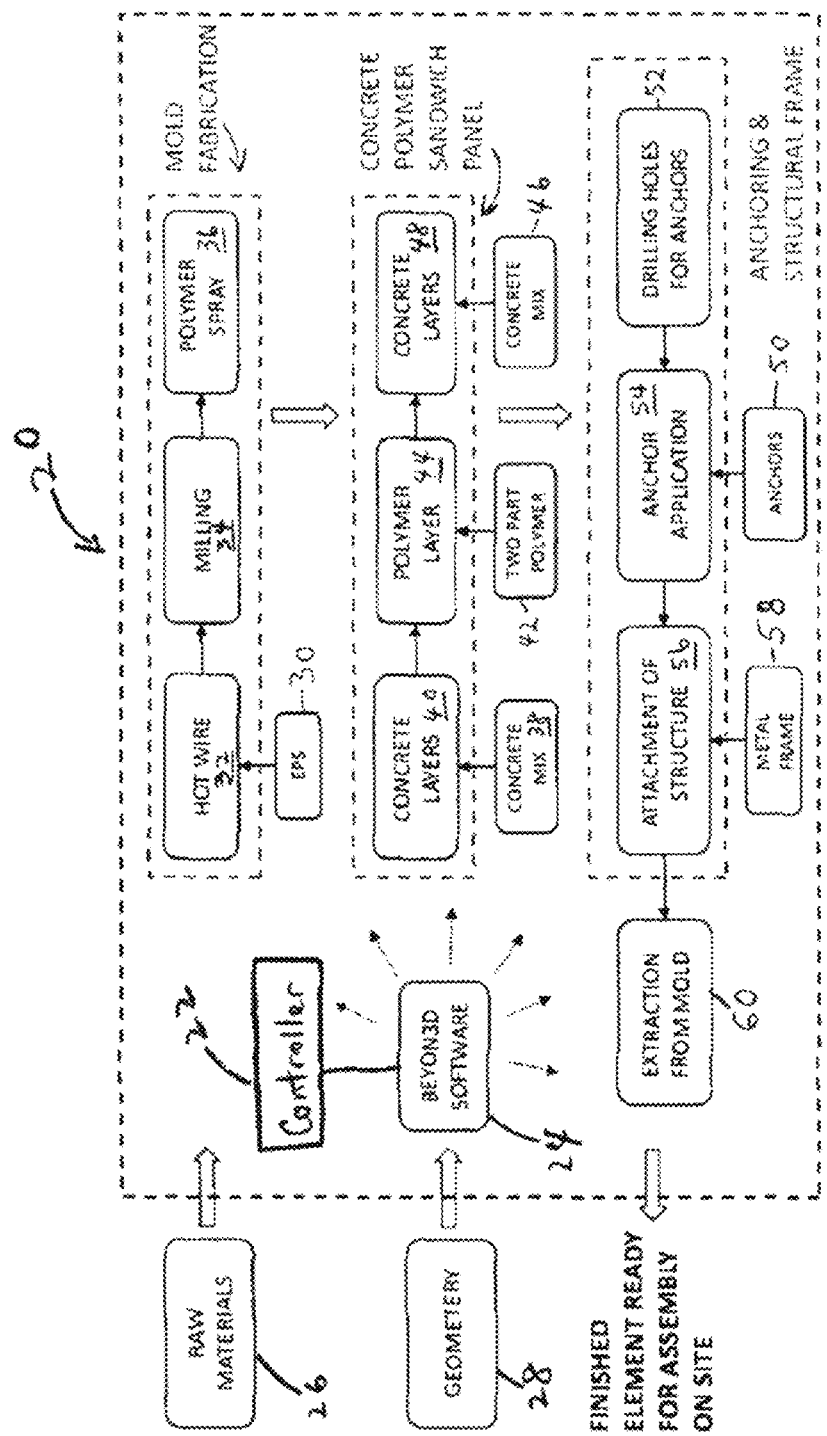
FIG. 2 is a diagram showing an embodiment of the inventive process.
Figure 3A:
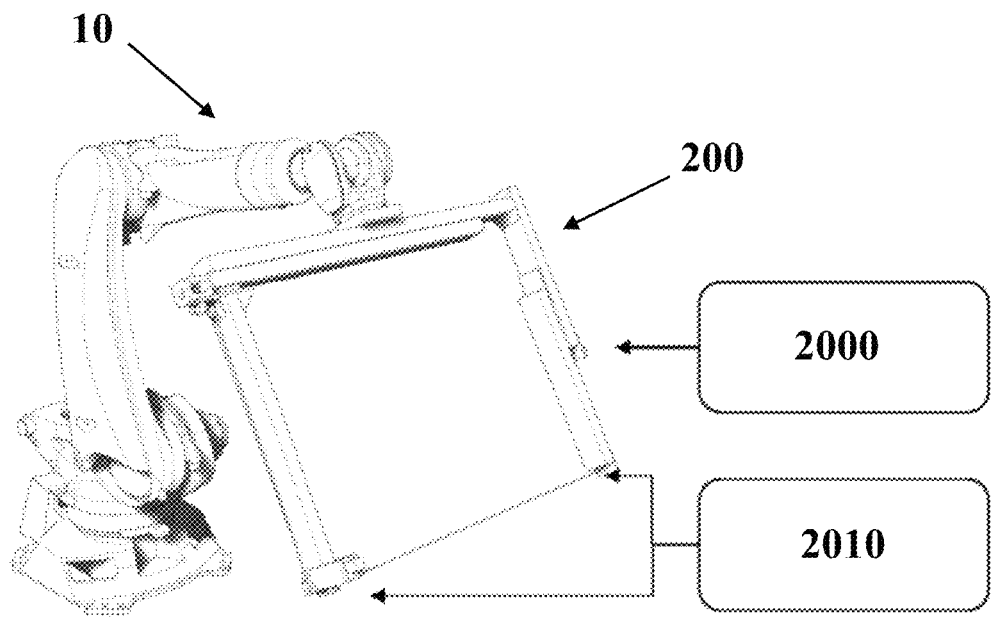
FIG. 3A presents a general schematic view of one embodiment of a hotwire end effector and its attachment to a robotic arm.
Figure 3B:
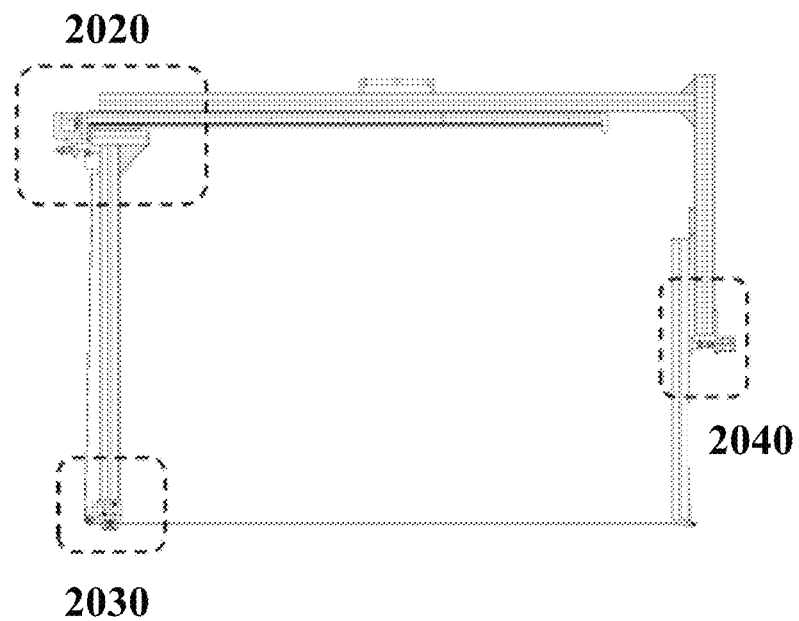
FIGS. 3B and 3C present detailed schematic views of the width adjustment means of the hotwire end effector depicted in FIG. 3A.
Figure 3C:
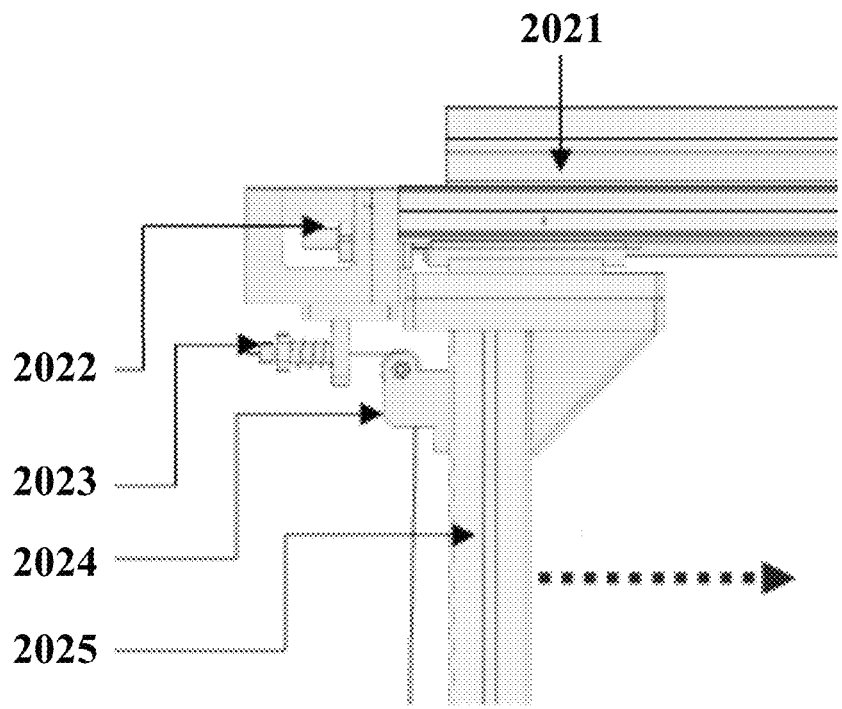
Figure 3D:
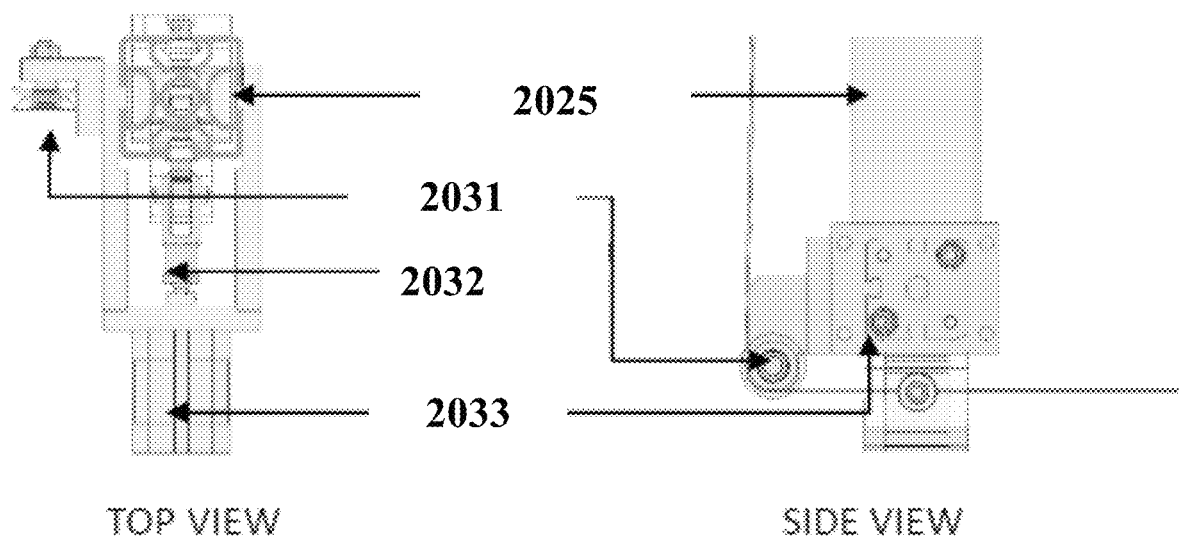
FIGS. 3D and 3E present detailed schematic views of the hot wire supply lead and wire tensor, respectively, of the hotwire end effector depicted in FIG. 3A.
Figure 3E:
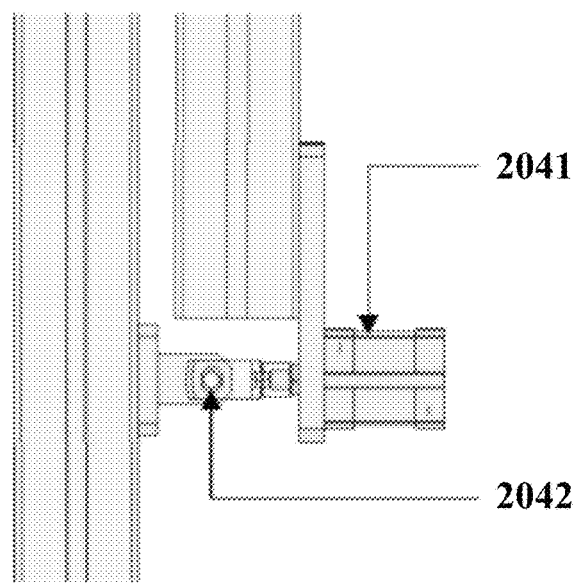

Reference is now made to FIG. 2, which presents a flow chart illustrating the steps of the method disclosed herein. The figure diagrammatically depicts robot cell 20, a defined space in which robotic arm 10 can move in order to fabricate an architectural component in accordance with instructions transmitted from a controller 22 comprising a commercially available Beyon3D software module 24. Raw materials 26 are provided to the robot cell and to the robotic arm for application by end effectors. Raw materials can be architectural materials such as concrete or gypsum, components or precursors thereof (e.g. cement), polymers, waxes, oils, etc.

In embodiments in which the form onto which the architectural material is to be layered is not commercially available, the initial phase of the process herein disclosed begins with fabrication of the three-dimensional form (e.g. a mold). A work piece, from which the form will be created, may be attached to rotary table 14. The work piece may be made of any suitable material, i.e. one that will retain its shape under the conditions of the process disclosed herein and that can be brought to a desired level of surface smoothness. In preferred embodiments, it is made of a polymeric (e.g. plastic or thermoplastic) material or combination of polymeric materials. In more preferred embodiments, it is made of polystyrene. In the most preferred embodiments, it is made of expanded polystyrene (EPS). In step 32, a hot wire end effector at the distal end of the robotic arm (10) is used to shape a surface of the work piece to produce a form (mold) 30 according to the geometry or geometrical requirements 28 transmitted by controller 22 via Beyon3D software module 24. This process is called "roughing," producing an approximation of the desired geometry. In preferred embodiments of the invention, after each cut, waste material produced by the cut is removed, preferably by a vacuum gripper.

In some embodiments of the invention, the location of the three-dimensional form is continuously monitored, e.g. by a camera in communication with the system control software.

In preferred embodiments, the method then continues with step 34, in which a milling end effector mills the shaped surface in order to refine further the shaped surface, if required. In preferred embodiments of the invention, waste material created during the milling is removed, preferably by suction from an optional vacuum system located near the support table.

If required, the surface undergoes additional preparation or finishing. In preferred embodiments, this additional preparation is accomplished by using a polymer spray end effector at the distal end of the robotic arm. The surface is prepared by applying or spraying a layer of sealant (preferably a composition comprising at least one polymer) of predetermined thickness (in preferred embodiments, 2-3 mm) from the polymer spray end effector onto the shaped outer surface of the form. In preferred embodiments of the invention, the polymer comprises wax. In more preferred embodiments, the polymer comprises a 90/10 (w/w) mixture of paraffin wax and oil, preferably Canola oil. The polymer layer provides a finish for the form, seals cracks, and fills other imperfections on the form's surface, creating a smooth, rigid mold that can be used for more than one cast. In preferred embodiments of the invention, the finished surface has a mirror finish. Using this process, either high or low density EPS foam can be shaped into a high-quality form, in contrast to processes known in the art that require the more expensive high density EPS.

In preferred embodiments of the invention, the quality of the surface of the three-dimensional form is determined by production of a height map of the surface. Such a height map can be produced by analyzing the surface with a 3D scanner that produces a height map of the surface, which can then be mathematically processed by standard statistical means for determining the smoothness of a surface. In other embodiments of the invention, the surface quality can be determined by use of a mechanical profilometer. If the quality of the surface is insufficient, additional smoothing can be performed.

The next phase is application of layers of an architectural material such as concrete to the form to create a shaped architectural component. Using a concrete spray end effector, the robotic arm sprays an architectural material suitable for use with the inventive system onto the finished surface.

In preferred embodiments of the invention, a custom concrete mix is used. In some embodiments of the invention, a self-compacting concrete mix is used. In some preferred embodiments of the invention, the architectural material has an initial setting time of between 10 seconds and 5 minutes. In other preferred embodiments of the invention, the architectural material has an initial setting time of less than 3 minutes; in more preferred embodiments of the invention, it has an initial setting time of less than 1 minute. In preferred embodiments of the invention, the viscosity of the cement increases by at least 50% $min^{-1}$ for the first 3 minutes after its casting. Cements that have these desired properties are well-known in the art. In some embodiments of the invention, the weights of the components of the architectural material are determined automatically prior to their mixing.

The architectural material is sprayed onto the finished surface of the form to form multiple layers of the architectural material until the desired overall thickness is achieved, thereby forming a layered architectural component. In preferred embodiments of the invention, each layer is less than 1 mm thick; in more preferred embodiments of the invention, each layer is between 0.5 mm and 1 mm thick. The custom made concrete mix is designed to achieve a high quality surface finish while maintaining good workability by controlling the viscosity and fluidity of the mix.

In some embodiments of the invention, the surface quality of the finished architectural component is analyzed by methods analogous to those described above for determining the surface quality of the three-dimensional form. In some embodiments of the invention, other physical properties of the architectural material (e.g. its thickness or its thickness profile) are measured subsequent to the spraying of the architectural material on the form.

In some embodiments of the invention, preparation of the architectural component is followed by anchoring a structural support frame to the component. The robotic arm countersinks anchors 50 (preferably by using a milling or drilling end effector), and attaches them to a support structural frame with fastening bolts in steps 52 and 54. In step 56, structural frame 58 is attached by the robotic arm to the architectural component using the anchors.

The architectural component and structural frame assembly (if present) are then separated from the form for attachment to a building structure (step 60).

The robotic arm uses various end effectors during the fabrication of the architectural component. Non-limiting examples of end effectors that are used in various embodiments of the invention include a hotwire end effector, a milling end effector, a polymer spray end effector, and a concrete spray end effector. In some embodiments of the invention, the system comprises an automatic tool changer that replaces end effectors as needed. In preferred embodiments in which the system comprises an automatic tool changer, the end effectors are changed under the direction of the control software.

Reference is now made to FIG. 3, which illustrates schematically one embodiment of a hotwire end effector 200. FIG. 3A illustrates the attachment of the hotwire end effector to the robotic arm 10, as well as the location of the air supply inlet 2000 to the pneumatic piston and the electrical leads 2010 for the hotwire heating element. FIG. 3B shows the location of width adjustment means 2020, the hot wire supply lead 2030, and the wire tensor 2040. FIG. 3C provides a more detailed schematic illustration of the width adjustment means 2020. Two arms of the end effector 2021 (in preferred embodiments, a 100×50 mm aluminum track) and 2025 (in preferred embodiments, a 50×50 mm aluminum track) are shown. Movement of arm 2025 in the direction of the dotted arrow is achieved via motor 2022, which pushes arm 2025 along the track by winding or unwinding a wire mounted over spring 2023 that passes over pulley 2023. FIG. 3D illustrates schematically a detailed view of the hot wire supply lead, which comprises a pulley 2031, an actuator 2032 for fixing the wire in place, and a motor 2033 for manipulating the hot wire. A schematic illustration of the wire tensor is shown in FIG. 3E. A pneumatic piston 2041 is controlled by actuator 2042.

Figure 4:
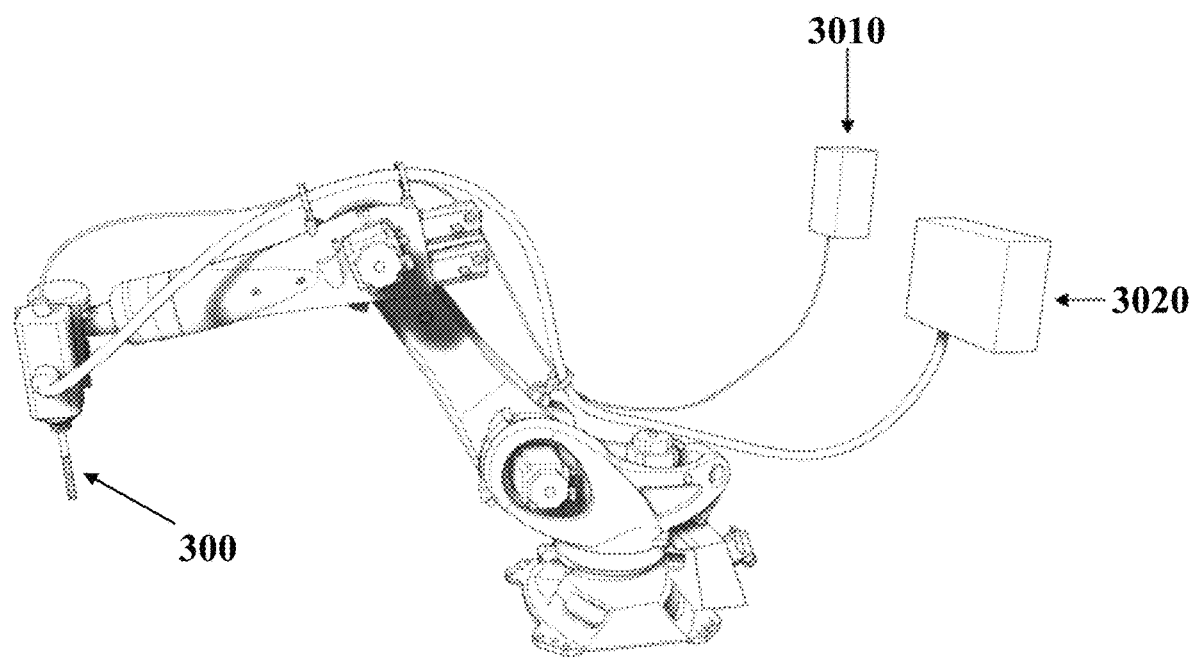
FIG. 4 illustrates schematically one embodiment of a milling end effector.

Reference is now made to FIG. 4, which illustrates schematically one embodiment of a milling end effector 300 attached to robotic arm 10. The milling end effector comprises digital inverter 3010 for translating digital signals that provides inter alia braking resistance protection, thermal protection, automatic boost, slip compensation, spindle fault detection, and speed control, and pneumatic control cabinet 3020, which is connected to a compressor (not shown in the figure). The pneumatic control cabinet comprises a regulator, tool release solenoids, an air pressure switch, and spindle cooling control. A motor (not shown in the figure) is connected to the digital inverter and to the pneumatic control cabinet. The milling end effector may also include a collet for retaining a spindle and other standard tools.

Figure 5A:
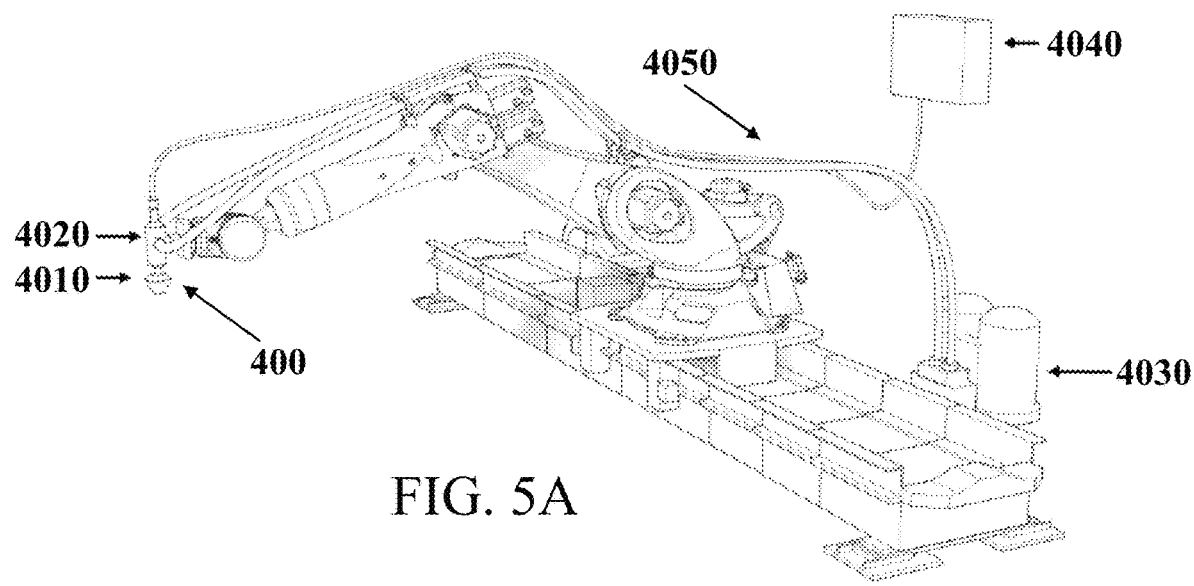
FIGS. 5A-5C present, respectively, a schematic illustration of a general view of one embodiment of a polymer spray end effector and its attachment to a robotic arm, an expanded view of the mixing chamber of the polymer spray end effector, and a schematic diagram of one embodiment of a wax transfer system of the polymer spray end effector.

Reference is now made to FIG. 5, which illustrates schematically a polymer spray end effector 400 for finishing the surface of the three-dimensional form. FIG. 5A presents a general schematic view of a polymer spray end effector attached (typically by an adaptor flange) to robotic arm 10. In the embodiment illustrated, the end effector comprises spray nozzle 4010; mixing chamber 4020 in fluid connection with the spray nozzle in which the components of the polymer are mixed prior to passing into the spray nozzle; component storage vessels 4030; a pneumatic chamber 4040 that controls the pressure of pressurized gas (e.g. air) in the system; and inlet lines 4050 that connect the component storage tanks to the mixing chamber. In preferred embodiments of the invention, the mixing chamber is placed as close as possible to the nozzle.

Figure 5B:
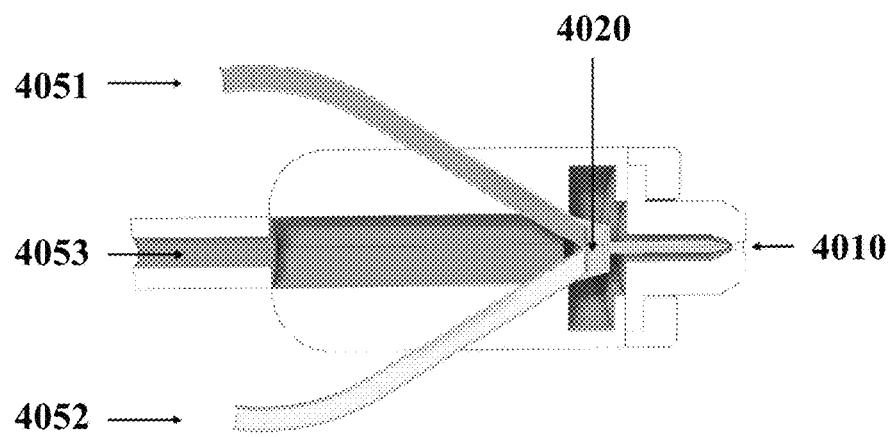

Reference is now made to FIG. 5B, which presents a schematic illustration of an expanded view of the mixing chamber and nozzle of the embodiment shown in FIG. 5A. The polymer passes through line 4051 (in embodiments in which the polymer two components, the second one passes simultaneously through line 4052), while compressed air or other inert gas passes through inlet line 4053. In embodiments in which the polymer comprises two components, the polymer components are mixed in the mixing chamber into a final curable, unitary polymer mixture. The polymer is then driven by gas pressure through the nozzle and onto the surface of the form. In some embodiments of the invention, the polymer used is wax. In preferred embodiments of the invention, a mixture of wax and oil is used. In more preferred embodiments of the invention, a mixture of wax and Canola oil is used. In the most preferred embodiments of the invention, a 90:10 (w/w) mixture of wax and Canola oil is used.

Figure 5C:
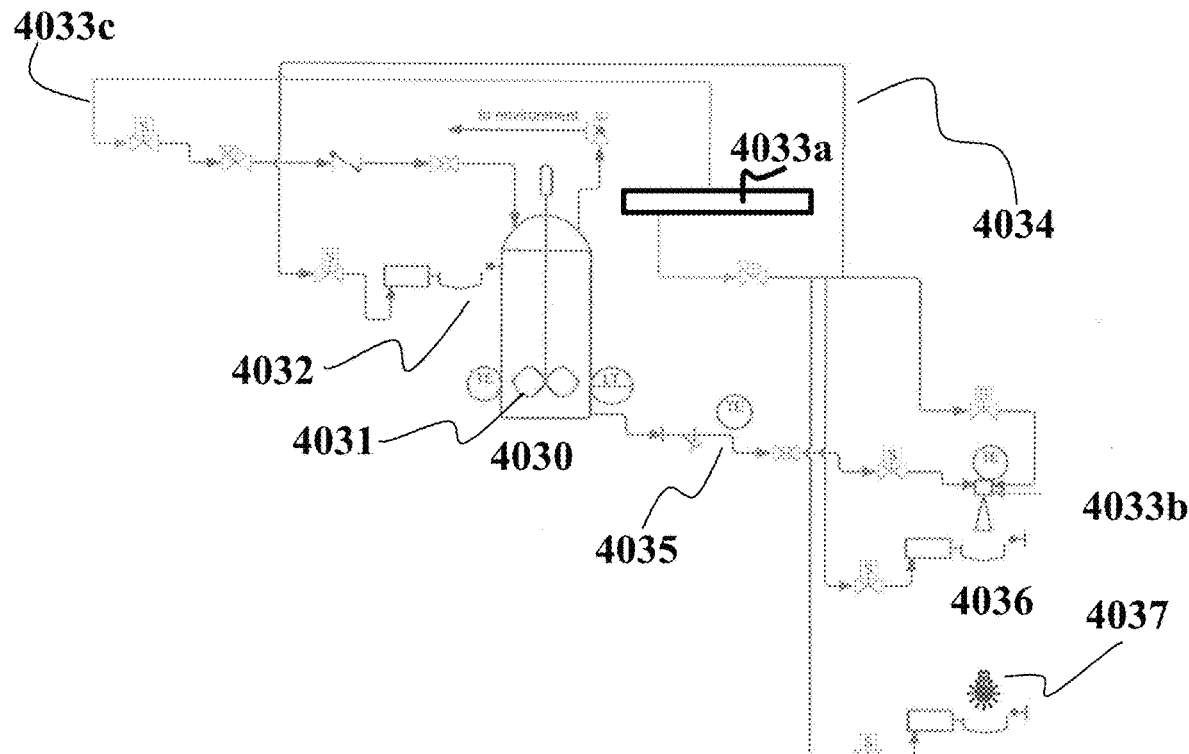

FIG. 5C illustrates schematically one preferred embodiment of a wax transfer system for transferring wax from storage vessel 4030 to spray nozzle 4010. The wax is fed to heated tank 4030, in some embodiments as solid wax. When the system is in use, the storage vessel is heated to a temperature sufficient to melt the wax. Any suitable heating system known in the art may be used. In preferred embodiments, the body, caps, flanges, and fittings of tank 4030 are constructed of stainless steel, and the storage vessel is thermally insulated. In typical embodiments, the vessel has a diameter of 5 inches, and the bottom of the vessel is conical (typically 30°) for drainage. The vessel may be fitted with a buoy switch, pressure switch, or the like to provide alarm feedback for a low wax level condition. The vessel contains mixer 4031 that stirs the wax after it is melted; any suitable mixer known in the art can be used. In preferred embodiments of the invention, wax is introduced into the storage vessel by an automated feed system, which is typically actuated pneumatically or electrically. Pressurized gas (typically air) is supplied to the system from supply 4033. The pressurized gas is delivered to the components of the wax transfer system via feed lines 4034. The liquid wax is transferred to the nozzle via feed line 4035. In preferred embodiments, feed line 4035 is heated externally and thermally insulated. An anti-drip cap 4036 is fitted to the spray nozzle to catch any drops of wax that drip from the spray nozzle. The anti-drip cap can be motorized for remote actuation. The wax transfer system also incorporates a heating lamp 4037 fixed to the chassis of the polymer spray end effector and directed toward the polymer spray end effector, preferably by a mount that is capable of both linear and angular adjustment. In preferred embodiments, the heating lamp is covered by a cover cap 4038 that keeps the lamp clean from wax and other material. The cover cap may be motorized for remote actuation, and may be constructed of any suitable material that can withstand the temperature of the melted wax (typically about 100° C.).

While it is within the scope of the invention that the sealant coats the three-dimensional form as a liquid, in preferred embodiments of the invention, the sealant (wax) solidifies while in transit to the three-dimensional form and coats the form as a layer of solid powder. The layer of solid powder is then heated (e.g. by an infrared heating element) until it at least partially liquefies, at which point the heating is stopped, the flow of sealant thereby creating a uniform smooth solid layer of sealant.

Figure 6A:
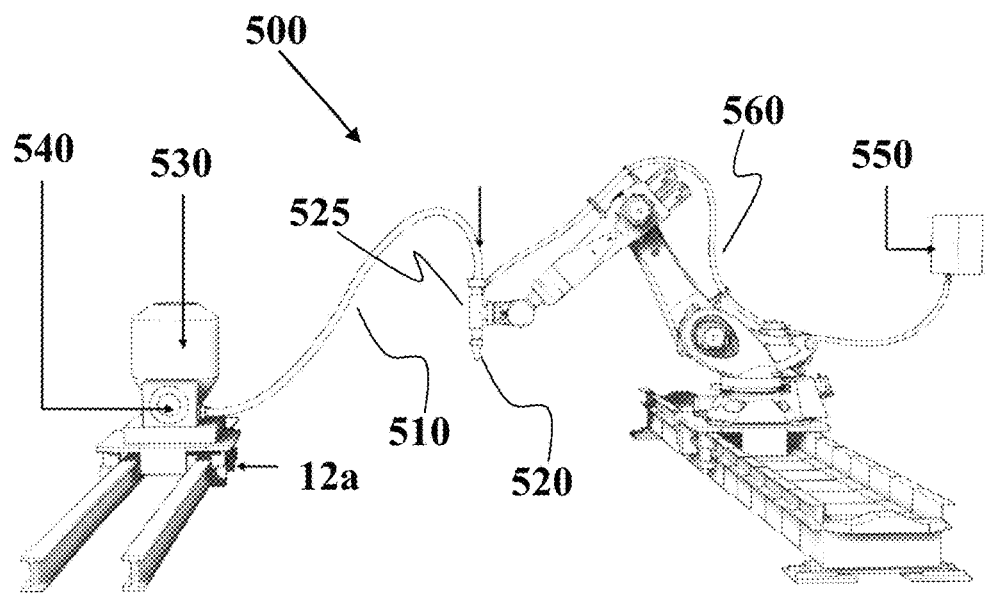
FIGS. 6A and 6B present, respectively, a schematic illustration of a general view of one embodiment of a concrete spray end effector and its attachment to a robotic arm, and a detailed schematic illustration of the mixing chamber and concrete spray nozzle.

Reference is now made to FIG. 6, which illustrates schematically one embodiment of a concrete spray end effector 500. FIG. 6A presents a schematic diagram of the concrete spray end effector attached to robotic arm 10. Concrete inlet line 510 delivers a sprayable concrete composition (or other sprayable architectural material) to concrete spray nozzle 520 from an architectural material storage vessel 530; in the case of the embodiment illustrated, storage vessel 530 comprises a concrete mixer. In the embodiment illustrated, peristaltic pump 540 moves the concrete from the concrete mixer to the concreted inlet line. Pressurized air (or other gas) is delivered to the concrete spray nozzle from a pressurized gas source (not shown in the figure) via air inlet line 560; the pressurized gas is controlled from pneumatic control cabinet 550. In preferred embodiments of the invention, the pressurized gas and the architectural material are mixed in mixing chamber 525 prior to introduction of the architectural material into concrete spray nozzle 520. Storage vessel and 530 and peristaltic pump 540 move along track 12*a* in tandem with the concrete spray end effector.

Figure 6B:
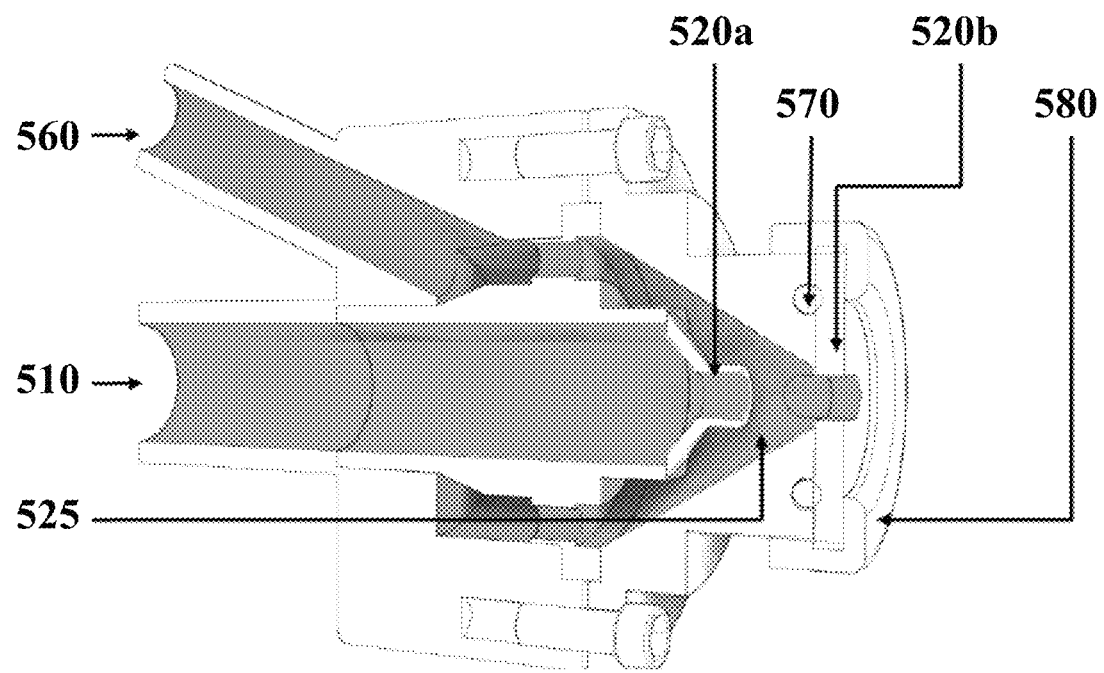

A schematic illustration of an expanded view of a preferred embodiment of the mixing chamber and concrete spray nozzle is shown in FIG. 6B. In this embodiment, the concrete spray nozzle comprises a dual-nozzle system. The architectural material passes through inlet line 510 into mixing chamber 525 via a first nozzle 520*a*. Simultaneously, pressurized gas enters the mixing chamber via inlet line 560. The pressure of the gas in the mixing chamber forces the sprayable architectural material through mixing nozzle 520*b*. Preferably, the mixing nozzle is sealed by O-ring 570 and removable cap 580.

Reference is now made to FIG. 7, which presents a schematic illustration the components of a second embodiment of a concrete spray end effector. This embodiment is especially useful for fast-setting architectural materials, as the components of the architectural material are mixed in situ, enabling deposition of even fast-setting materials before they have had time to harden.

Figure 7A:
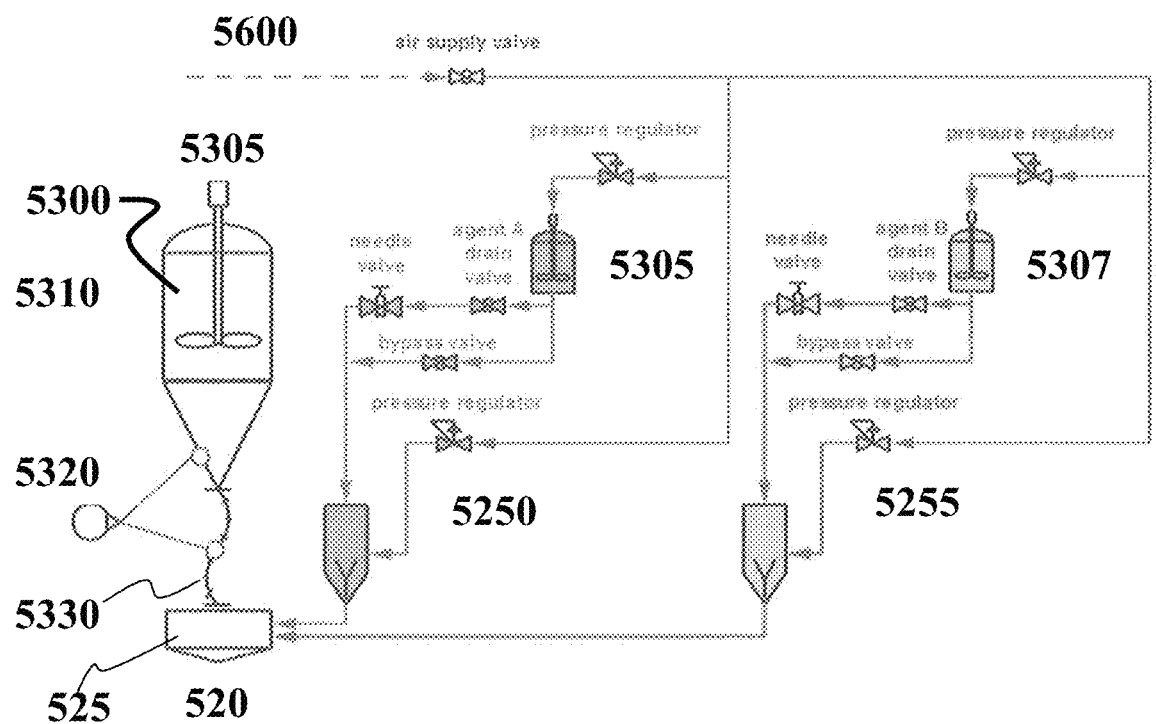
FIGS. 7A and 7B present, respectively, a schematic diagram of a second embodiment of a concrete spray end effector and a detailed view of the introduction of material into the mixing chamber.
Figure 7B:
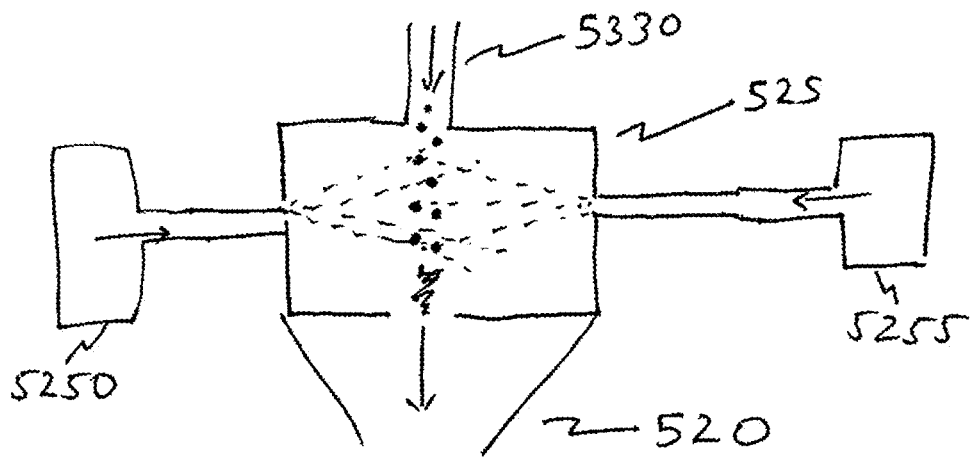

A general schematic of the concrete spray end effector and the means for bringing the components of the architectural material to the form is presented in FIG. 7A. A solution comprising at least one component of the architectural material (or the component itself if it is a liquid of sufficiently low viscosity) is placed in a first storage vessel 5305, which is in fluid connection with a first mixing chamber 5250, which is in fluid connection with nozzle mixing chamber 525. Depending on how many components the architectural material comprises, a second solution comprising at least one second component may be placed in a second storage vessel 5307, which is in fluid connection with a second mixing chamber 5255, which is also in fluid connection (independent of the first mixing chamber) with the nozzle mixing chamber. Additional storage vessels and mixing chambers may be added if necessary. The storage vessels may be in fluid connection with a pressurized gas line 5600; gas pressure drives the solutions into the mixing chambers, from there into the nozzle mixing chamber and from there into the nozzle.

Components of the architectural material are introduced into a third mixing chamber 5300 via inlet 5305. In an exemplary embodiment of the invention, dry cement mix, an aggregate phase (e.g. sand), cellulose, a superplasticizer, and water are added to the third mixing chamber in proportions that will yield a cement having the desired physical properties (e.g. setting time and viscosity). The third mixing chamber comprises a mixer 5310 that mixes the components into a slurry and that keeps the contents of the third mixing chamber under constant agitation. The slurry passes from the third mixing chamber into nozzle mixing chamber 525, preferably via a flexible hose 5350. In preferred embodiments of the invention, a vibrating member is physically connected to at least one of the third mixing chamber, the flexible hose, and the top of the spray nozzle, to insure that the grains do not settle or stick together.

Solutions or dispersions of additional components (e.g. a setting time accelerant and a viscosity adjusting material) are introduced into the nozzle mixing chamber. They are preferably nebulized or sprayed to ensure maximum dispersion of the solutions or dispersions. They may be introduced from different (preferably opposing) sides of the nozzle mixing chamber so that the flows or sprays of the two solutions intersect within the nozzle mixing chamber. As the cement slurry passes from the third mixing chamber through the nozzle mixing chamber, it passes through the flows or sprays of the other components, thereby creating the curable fluid architectural material in situ as the components pass through the nozzle mixing chamber into the nozzle. The curable fluid architectural material is sprayed via the nozzle onto the form, where it sets. The process is shown schematically in FIG. 7B. As a non-limiting example of a type of architectural material that can be produced in this manner, a dispersion comprising a setting time accelerant such as $Al(OH)_3$ and a thickening agent such as Rheomatrix 150 flow independently from the second mixing chamber to the nozzle mixing chamber via a second inlet, while a slurry comprising a commercially available Portland cement mix, an aggregate such as quartz sand, cellulose, a superplasticizer, and water flows from the third mixing chamber to the nozzle mixing chamber via a third inlet. Within the nozzle mixing chamber, the flow of powdered solid components intersects the flows or sprays of the two solutions, thereby mixing with them and forming a fast-setting concrete that is then sprayed from the cement spray nozzle.

In one exemplary non-limiting preferred embodiment of the invention, the inventive spraying process uses a compressor to actuate a first high viscosity pump to send concrete mix to the concrete spray end effector for the robotic arm 10. A compressor, which may be the same one or a different one, may also be used to actuate a second high viscosity pump to send one or more components of a coating material to a polymer spray end effector for the robotic arm 10. The control parameters for effecting an optimal flow rate include air pressure, flow rate, and mix composition of the concrete and polymer components.

As mentioned above, in preferred embodiments of the invention, the system is under computer control, both for the fabrication of the three-dimensional form and for the fabrication of the architectural component. The computer control is performed by a commercially available Beyon3D software package that is briefly described here. Software module 24 (FIG. 2) is designed to have a simple, user-friendly, and intuitive user interface (UI/UX) for a universal robotic cell having a minimum of 6 adjustable axes robotic cell. The user interface can be used even by untrained operators. The software module generates and monitors a complete geometry to product process (robotic toolpath generation) without any necessity for intervention on the part of the operator or for any type of manual work.

The software module provides three sub-modules for the three phases of the inventive process that allow the user to customize the entire fabrication process: (a) a robotic cell setting sub-module 2410; (b) a task configuration sub-module 2420; and (c) a simulation/output to controller sub-module 2430 The software additionally provides a real-time collision detector and a live sub-module in the universal robotic controller which is a universal interface between the software and the various pieces of robotic equipment.

Cell setting sub-module 2410 is used by the operator to select a configured cell with various robotic types, to define a working cell or space (as a non-limiting example, in a Cartesian coordinate system) in which the robotic arm is permitted to move, and to define the position of the robotic arm relative to the working cell. Upon completion of these tasks, the cell setting sub-module outputs spatial constraint and control data.

Task configuration sub-module 2420 is used by the operator to select a desired fabrication process, in some embodiments from a library or database. The desired fabrication process may be suggested to the user by the software according to the current cell configuration, which also includes the types of available end-effectors, and to define the position and dimensions of the work space.

Information from all previous phases is input into the simulation/output to controller play sub-module 2430, which outputs a robotic arm simulation for the operator to view and provides error messages if the fabrication process is programmed to engage in tasks that are outside of pre-defined parameters, or if one or more system components is programmed to move on a path or engage in a task that is outside of predefined boundaries or parameters. If the simulation is successfully completed, the sub-module outputs the final fabrication parameters and settings for the robot arm and end effector(s) to the robotic cell interface—live sub-module. This module allows the software to control the movements of the robotic arm, end effector(s), movable platform, and work piece and also to retrieve the current location of the robotic equipment and perform a real-time collision detection in order to detect possible collisions in real-time and bypass those collisions in real-time. In addition, the play sub-module continuously shows a real-time simulation of the robotic cell to the operator in order to enable real-time viewing and monitoring of the current activity and fabrication process.

The live sub-module is a software package that integrates the robot to the other submodules in a single interface. The live sub-module can be written in any language appropriate to the robotic equipment being used. The live sub-module allows full control of the robotic cell and allows a fabrication task creation regardless of any local robot controller limitations such as the number of points. That is, in contrast to software systems known in the art, the live sub-module of the Control3D software allows transfer of an unlimited number of points to the robot controller.

Figure 8:
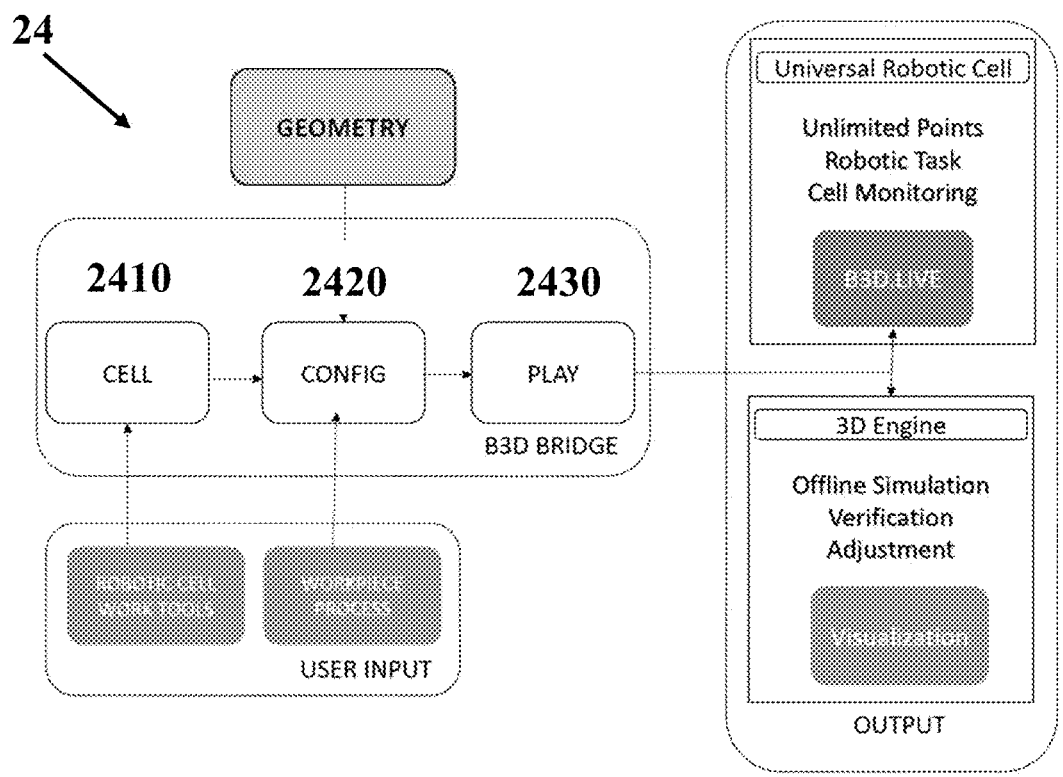
FIG. 8 illustrates schematically the logic flow of the automated control of the system herein disclosed; and, FIG. 9 illustrates schematically one exemplary embodiment of the system and method herein disclosed.

A flowchart presenting the logic flow of the software controls is presented in FIG. 8.

Figure 9:
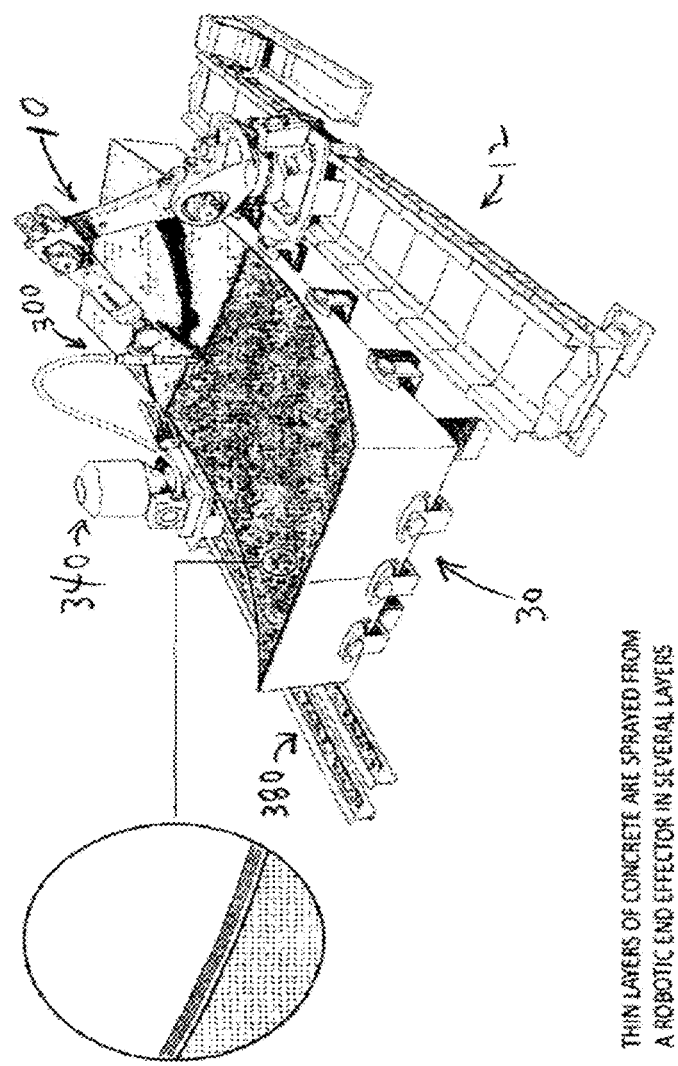

Reference is now made to FIG. 9, which illustrates schematically a non-limiting exemplary application of the inventive process. As shown, the robotic arm (10) mounted on rail guide 12 has a concrete spray end effector comprising a spray nozzle 300. A concrete mixer 340 supplies concrete mix as the nozzle 300 applies a layer of concrete from the concrete mixer onto a surface of the three-dimensional form 30. Multiple layers of concrete may be applied to achieve a desired thickness as determined by the Beyon3D software module 24 of controller 22.

As described above, the inventive fabrication process begins with a work piece preferably made of EPS, which is dimensioned and roughed into shape by a hot wire end effector and then finished using a milling end effector in two different phases, thereby forming a mold (three-dimensional form). A sealing layer of polymer is sprayed onto the mold for smoothing imperfections caused by the use of low density EPS, thereby ensuring that the form will be reusable. Architectural material (e.g. concrete) is then sprayed in successive layers until the required thickness is achieved. In this manner, an architect or engineer can quickly design an architectural component using conventional, commercially available software such as Rhino3D™ and any modeled geometry from the modeling software is translated into fabrication instructions for the robotic arm by software module 24. The newly designed architectural component is thereby fabricated by the novel system and process herein disclosed. Advantageously, complex curvilinear shapes (including non-repetitive shapes) for a building structure can be fabricated using the inventive system and process herein disclosed.

I claim:

1. A computer controlled system for constructing an architectural component from an architectural material, the system comprising:
   a multi-task robotic arm capable of 6-axis movement, the multi-task robotic arm having a base and a distal end, wherein said base is mounted on a controllably moveable carriage, and wherein said distal end of the multi-task robotic arm comprises a removable end effector configured to perform addition of the architectural material, wherein the architectural material is a cementitious material and, wherein said removable end effector comprises a cementitious material spray end effector;
   a computer-controlled positioner mounted on a linear rail, said positioner is configured to work in conjunction with the multi-task robotic arm, wherein said positioner comprises a rotary table configured to position a three-dimensional form for the multi-task robotic arm, and, wherein said positioner is capable of rotational and translational movement and, wherein the multi-task robotic arm and the computer-controlled positioner together are capable of 8-axis movement;
   a computer in communication with the positioner and the multi-task robotic arm, said computer comprising a controller and a software module, wherein said controller configured to control a sequence of movements of said positioner and said controllably moveable carriage, said base and said distal end of said multi-task robotic arm and, to transmit instructions via the software module to sequentially apply layers of the architectural material to form the architectural component of a predetermined shape and dimension;
   an automatic tool changer in communication with the controller, wherein said automatic tool changer is configured to change the end effector in accordance with instructions transmitted by the controller via the software module;
   said three-dimensional form disposed on the rotary table upon which the architectural component is constructed;
   an architectural material storage vessel which contains the cementitious material;
   an architectural material inlet line through which the cementitious material is transferred from the storage vessel to the cementitious material spray end effector; and
   a pressurized gas inlet line through which pressurized gas is delivered to the cementitious material spray end effector to be mixed with the cementitious material to form a sprayable cementitious material;
   wherein the cementitious material spray end effector is configured to spray the sprayable cementitious material onto the three-dimensional form to form the architectural component.

2. The system of claim 1, wherein the cementitious material spray end effector comprises a concrete spray nozzle; wherein the architectural material inlet line comprises a concrete inlet line connecting said concrete spray nozzle to the storage vessel; the system further comprising pumping means for pumping the cementitious material from the storage vessel to the concrete spray nozzle via the inlet line; and, wherein the pressurized gas inlet line comprises an air inlet line configured to provide a fluid connection between a source of pressurized gas and said concrete spray nozzle.

3. The system of claim 2, wherein said pumping means comprise
   a peristaltic pump.

4. The system of clam 3, wherein the sprayable cementitious material is a sprayable concrete composition.

5. The system according to claim 1,
   wherein said end effector comprises a concrete spray rig and a spray head,
   wherein the spray head comprises a first spray head inlets, a second spray head inlet, and a third spray head inlet;
   wherein said concrete spray rig comprises:
      a first mixing chamber comprising an outlet in fluid connection with the first spray head inlet;
      a second mixing chamber comprising at least one inlet and an outlet in fluid connection with the second spray head inlet; and, a third mixing chamber comprising at least one inlet and an outlet in fluid connection with the third spray head inlet; and wherein said spray head is configured such that when material enters said spray head simultaneously through said first spray head inlet and at least one of said second spray head inlet and said third spray head inlet, at least part of the material entering said spray head from said first spray head inlet encounters material entering from any other spray head inlet through which material is entering said spray head.

6. The system according to claim 1, wherein said instructions comprise at least one software package selected from the group consisting of:

real-time collision detection software that is configured to enable the system to detect automatically at least one status selected from the group consisting of a) two components moving on a course that will cause them to collide; b) two components are within a predetermined distance of one another; and c) one component is on a course to self-collision; real-time simulation software configured to enable an operator to view a simulation of movement of at least one component of said system;

an interface that is configured to allow transfer of an unlimited number of points from said computer processor to any other component of the system; and, software configured to accept as input a desired geometry of said three-dimensional form and to control said system from said input to a final construction of an architectural component without any intervention by an operator of the system.

7. A method for manufacturing an architectural component with the computer controlled system of claim 1, wherein said method comprises:

preparing a three-dimensional form from a work piece made of a polymeric material;

sequentially layering an architectural material on at least one surface of said three-dimensional form using the removable end effector disposed on the distal end of the multi-task robotic arm, the removable end effector being configured to perform addition of the architectural material, thereby producing said architectural component, wherein the architectural material is a cementitious material and, wherein said removable end effector comprises a cementitious material spray end effector; and removing said architectural component from said three-dimensional form.

8. The method according to claim 7, further comprising applying a layer of a coating material to at least one surface of said three-dimensional form.

9. The method according to claim 8, wherein said coating material comprises paraffin wax.

10. The method according to claim 8, wherein said step of applying a layer of coating material comprises:

heating said coating material in a storage vessel until said coating material liquefies;

passing said liquefied coating material to a spray head oriented toward said three-dimensional form; and, spraying said coating material on said at least one surface of said three-dimensional form.

11. The method according to claim 7, further comprising preparing a three-dimensional form, from a work piece made of a polymeric material, comprising:

supporting a work piece made of a polymeric material on a movable support table in communication with a computer processor, said support table capable of movement in response to commands from said computer processor;

sequentially removing material from said work piece by use of an end effector comprising a hot-wire foam cutter, said end effector positioned at a distal end of a multi-task robotic arm in communication with said computer processor and moving in cooperation with said support table in response to commands from said computer processor, thereby forming a three-dimensional form having a desired shape; and, optionally milling said three-dimensional form subsequent to said step of sequentially removing material from said work piece.

12. The method according to claim 11, wherein said polymeric material comprises expanded polystyrene foam.

13. The method according to claim 11, further comprising applying a layer of a coating material to at least one surface of said three-dimensional form.

14. The method according to claim 7, wherein said step of preparing a three-dimensional form from a work piece made of a polymeric material comprises at least one step selected from the group consisting of:

preparing a three-dimensional form by use of a computer-controlled multi-task robotic arm;

machining said architectural component; and supporting a work piece made of a polymeric material on a movable support table in communication with a computer processor, said support table capable of movement in response to commands from said computer processor.

15. The method according to claim 7, further comprising attaching fasteners to said architectural component.

16. The method according to claim 7, wherein said step of sequentially layering an architectural material on at least one surface of a three-dimensional form comprises sequentially layering an architectural material on at least one surface of a three-dimensional form until a thickness of between 8 and 20 mm is obtained.

17. The method according to claim 7, wherein said architectural material has an initial setting time of between 10 seconds and 5 minutes.

18. The method according to claim 7, wherein said step of sequentially layering an architectural material comprises:

introducing a cement mix, aggregate, water, optionally at least one of cellulose and superplasticizer into a first mixing chamber in fluid communication with a first inlet into a nozzle mixing chamber;

mixing said cement mix, aggregate, water, and, if present, cellulose and superplasticizer in said first mixing chamber, thereby producing a mixture;

introducing a solution or dispersion comprising a setting time accelerant into a second inlet into said nozzle mixing chamber such that said solution is at least partially nebulized within said nozzle mixing chamber;

introducing a thickening agent into a third inlet into said nozzle mixing chamber such that said thickening agent is at least partially nebulized within said nozzle mixing chamber;

introducing said mixture into said nozzle mixing chamber via said first inlet such that said mixture passes through said solution or dispersion and said thickening agent within said nozzle mixing chamber, thereby creating a wet architectural material; and, spraying said wet architectural material from said spray nozzle onto at least one surface of said three-dimensional form before said initial setting time of said wet architectural material.

19. The method according to claim 7, wherein said polymeric material comprises expanded polystyrene foam.

* * * * *